L. C. RUMBERGER.
Harrows.

No. 145,016.　　　　　　　　　　Patented Nov. 25, 1873.

Witnesses.
E. M. Bates.
G. E. Upham

Inventor.
Levi C. Rumberger
Chipman Hosmer & Co
Attys

UNITED STATES PATENT OFFICE.

LEVI C. RUMBERGER, OF CASS, PENNSYLVANIA.

IMPROVEMENT IN HARROWS.

Specification forming part of Letters Patent No. 145,016, dated November 25, 1873; application filed May 24, 1873.

*To all whom it may concern:*

Be it known that I, LEVI C. RUMBERGER, of Cass, in the county of Venango and State of Pennsylvania, have invented a new and valuable Improvement in Eyelets for Harrow-Teeth; and I do hereby declare that the following is a full, clear, and exact description of the construction and operation of the same, reference being had to the annexed drawings, making a part of this specification, and to the letters and figures of reference marked thereon.

Figure 1:
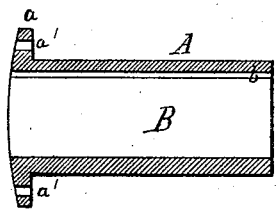
Figure 2:
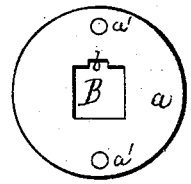
Figure 3:
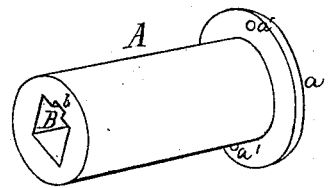

Figure 1 of the drawings is a representation of my invention by a longitudinal section. Fig. 2 is a top view. Fig. 3 is a perspective view of the same.

My invention relates to harrows; and it consists in the construction and novel arrangement of round sockets or eyelets, with square holes for the reception of harrow-teeth, in the frame, so that, by turning said sockets, the harrow-teeth may be reversed. The object of my invention is to reverse the teeth of a harrow after they are worn, because then their shape is very advantageous for working in a reversed position. The rusting tightly into the harrow, or the working loose in it of the harrow-teeth, is hereby avoided, as well as the liability of the harrow to get out of order on account thereof.

In the drawings, A represents an eyelet with a horizontal flange, $a$, and two diagonally-opposite holes, $a'$, for fastening the eyelet with nails or screws to the harrow. The eyelet A is externally cylindrical, and has a central square hole, B, into which the head of a harrow-tooth is fitted, and there secured by driving a wedge or key between it and a groove, $b$, in the said square hole. The eyelet A is vertically inserted into the harrow with the flange resting on top of the same, where it is fastened by driving nails or screws through the holes $a'$ into the wood.

In reversing the harrow-teeth front backward, the sockets or eyelets, after being released from their fastening, are turned around, and the old holes in the wood are again serviceable for fastening the eyelets again.

What I claim as new, and desire to secure by Letters Patent, is—

In a harrow, the cylindrical eyelet A with the flange $a$, the diametrically-opposite holes $a'$, the square hole B, and the key-groove $b$, substantially as specified.

In testimony that I claim the foregoing I have hereunto subscribed my name in the presence of two witnesses.

LEVI CUNNINGHAM RUMBERGER.

Witnesses:
ALBERT KOCH,
JERRY H. KOCH.